United States Patent [19]

Frisen

[11] 3,820,879
[45] June 28, 1974

[54] BIOMICROSCOPIC EYE CONTACT GLASS
[75] Inventor: Lars Frisen, Askim, Sweden
[73] Assignee: Incentive Research & Development AB, Stockholm, Sweden
[22] Filed: Dec. 29, 1972
[21] Appl. No.: 319,484

[30] Foreign Application Priority Data
Jan. 31, 1972 Sweden.............................. 1100/72

[52] U.S. Cl............................ 351/1, 351/6, 351/15
[51] Int. Cl............................................. A61b 3/10
[58] Field of Search............... 351/6, 7, 14, 16, 1, 15

[56] References Cited
OTHER PUBLICATIONS
Bausch and Lomb Optical Co., "Allen Gonioscope Prism," pages 1-7, September 1947.

Primary Examiner—Paul A. Sacher
Attorney, Agent, or Firm—Kenway & Jenney

[57] ABSTRACT
A contact glass device for biomicroscopic examination of the human eye, comprises a lens body with a concave surface adapted for application upon the cornea of the eye to be examined with the optical axis of the lens coinciding with the optical axis of the eye and two light reflecting mirror surfaces disposed at the side of the lens body opposite to said concave surface so as to face each other on opposite sides of the optical axis of the lens. The two mirror surfaces are inclined at such angles relative to the optical axis of the lens body and relative to each other that it is possible to view the interior of an eye, on which the lens body is applied with its concave surface, in a non-reversed manner along a line of view which is reflected in the two mirror surfaces and passes through the lens body. In a preferred embodiment of such a contact glass device one of the two mirror surfaces is pivoted relative to the lens body so that the field of view within the interior of the eye, which is obtained along a line of view reflected in the two mirror surfaces and passing through the lens body, can by rotation of the pivoted mirror surface be moved continuously from the central portion of the fundus of the eye radially outwards to the boundary region of the fundus at the ciliary muscle.

10 Claims, 3 Drawing Figures

PATENTED JUN 28 1974

BIOMICROSCOPIC EYE CONTACT GLASS

BACKGROUND OF THE INVENTION

1. Field of the Invention

The present invention relates to a contact glass device for use in biomicroscopic examinations of the eye.

2. Description of the Prior Art

For slit-lamp examinations of the vitreous body and the retina of the eye it is necessary to produce an optical image of the region in the eye, which one wishes to examine, in the object plane of the microscope used for the examination. For this object it is known in the art to use a contact lens applied directly on the cornea of the eye. Using such a simple contact lens, however, it is difficult and awkward to examine anything but the central portion of the fundus of the eye. In order to overcome these difficulties it is known in the art to provide the contact lens with a reflecting surface disposed at an angle to the optical axis of the lens so as to reflect an image of a more peripheral portion of the fundus into the microscope. Contact glasses of this type are known in the art, which are provided with as many as three separate mirror surfaces forming angles of different magnitudes with the optical axis of the contact glass, whereby these mirror surfaces can reflect into the microscope images of different portions of the fundus, which are located at corresponding different radial distances from the central portion of the fundus, which can be observed directly through the contact lens without use of any reflection in the mirror surfaces. However, also the use of such a contact glass is cumbrous and it has also turned out to be difficult and requiring considerable experience to interpret the observations made by means of such a contact glass. The reason for this is probably that the image of the central portion of the fundus that may be obtained directly through the contact lens without any reflection in the mirror surfaces is non-reversed, whereas on the other hand the images of more peripheral portions of the fundus, which may be obtained by use of reflection in the mirror surfaces, are reversed due to the reflection in the mirror surfaces. Moreover, the separate mirror surfaces of such prior art contact glasses give images of separate, restricted areas of the fundus and it is difficult to determine the exact locations within the eye of the borders of these separate image areas as well as the location of any overlapping portions of these image areas. This makes it difficult to give a correct interpretation of the observations made through the contact lens and to determine the location within the eye of phenomena of interest that may be observed. The use of these prior art contact glasses provided with reflecting surfaces is made still more difficult by the fact that during an examination repeated and frequent changes of the setting and position of the microscope as well as simultaneously also of the position of the slit-lamp and the contact glass are necessary.

SUMMARY OF THE INVENTION

The primary object of the invention is therefore to provide an improved contact glass device for biomicroscopic examinations of the eye, by means of which it is possible to obtain a non-reversed image not only of the central region of the fundus of the eye but also of all other portions of the fundus right out to the boundary region of the fundus at the ciliary muscle.

An other object of the invention is to provide such an improved contact glass device, which permits a continuous radial scanning of the fundus of the eye from the central portion of the fundus right out to its boundary region.

Still another object of the invention is to provide a contact glass device, which permits observation in a non-reversed fashion not only of the fundus of the eye but also of the anterior chamber angle in the eye.

For these objects the invention provides a contact glass device for biomicroscopic examinations of the eye, which comprises a lens body of a transparent material provided with a concave surface adapted for application upon the cornea of the eye with the axis of symmetry of the concave surface coinciding with the optical axis of the eye and having such a focal length that the interior of the eye can be viewed through the lens body by means of a microscope, and first and second light reflecting surfaces located at the side of the lens body opposite to said concave surface and on opposite sides of said axis of symmetry so as to face each other and having their perpendiculars parallel to a common plane containing said axis of symmetry and inclined relative said axis of symmetry in such a manner that the interior of the eye can be viewed non-reversed along a line of view which is reflected in both said reflecting surfaces and passes through the lens body.

A contact glass device according to the invention provides always a non-reversed image of the area of the interior of the eye being viewed, both when the central portion of the fundus is viewed directly through the lens body without use of any reflections in the mirror surfaces and when more peripheral portions of the fundus are viewed along a line of view which is reflected in the two mirror surfaces. This makes it much easier to interpret the image being viewed and to determine the exact location within the eye of any phenomena detected in the viewed image.

It is especially preferred that one of the two light reflecting surfaces in the contact glass device according to the invention is pivoted relative to the lens body about a pivot axis, which is perpendicular to the common plane parallel to the perpendiculars of the two light reflecting surfaces and which is located at the edge of said pivotal light reflecting surface closest to the lens body, whereby the angle of the inclination of this light reflecting surface relative to the optical axis of the lens body and the eye can be varied continuously. This gives the additional important advantage that without any change of the position of the contact glass device relative to the eye it is possible to move the viewed image area continuously from the center of the fundus in radial direction towards the boundary region between the fundus and the ciliary muscle, and that the viewed image remains non-reversed during this process. This makes it much easier to determine the exact location of any observed phenomena and, additionally, the number of necessary changes of the position of the contact glass device relative to the eye for a complete examination of the eyes is reduced considerably. With the pivoted light reflecting surface in its one end position it is furthermore made possible to examine also the anterior chamber angle in the eye, which is often of a great interest.

BRIEF DESCRIPTION OF THE DRAWINGS

The invention and additional advantageous features thereof will be described more in detail in the following with reference to the accompanying drawings, which show by way of example some embodiments of the invention. In the drawings

The contact glass device according to the invention shown schematically and by way of example in FIGS. 1 and 2 comprises as conventional a lens body 1 of a suitable transparent material, as for instance glass or a suitable plastic material, which has a concave surface adapted to be applied directly on the cornea 2 of an eye, generally designated by 3, and the portion of the eye ball surrounding the cornea 2. Of the eye FIG. 1 shows only schematically the anterior chamber 4, the posterior chamber 5, the iris 6, the lens 7 with the ciliary muscle 8, and the vitreous body 10 which is located behind the lens 7 and is surrounded by the fundus 9 of the eye. The contact lens body 1 has such a focal length that it can convey an image of the interior of the eye to the object plane of a microscope (not illustrated in the drawing), which is oriented with its optical axis parallel to the optical axis A—A of the lens body 1. The lens body 1 is mounted in the one end of a tubular, substantially cylindrical housing 11, which has its opposite end closed by a transparent disc 12 of any suitable material. The housing 11 is surrounded by a rotatable ring 13, the object of which will be explained in the following.

Figure 1:
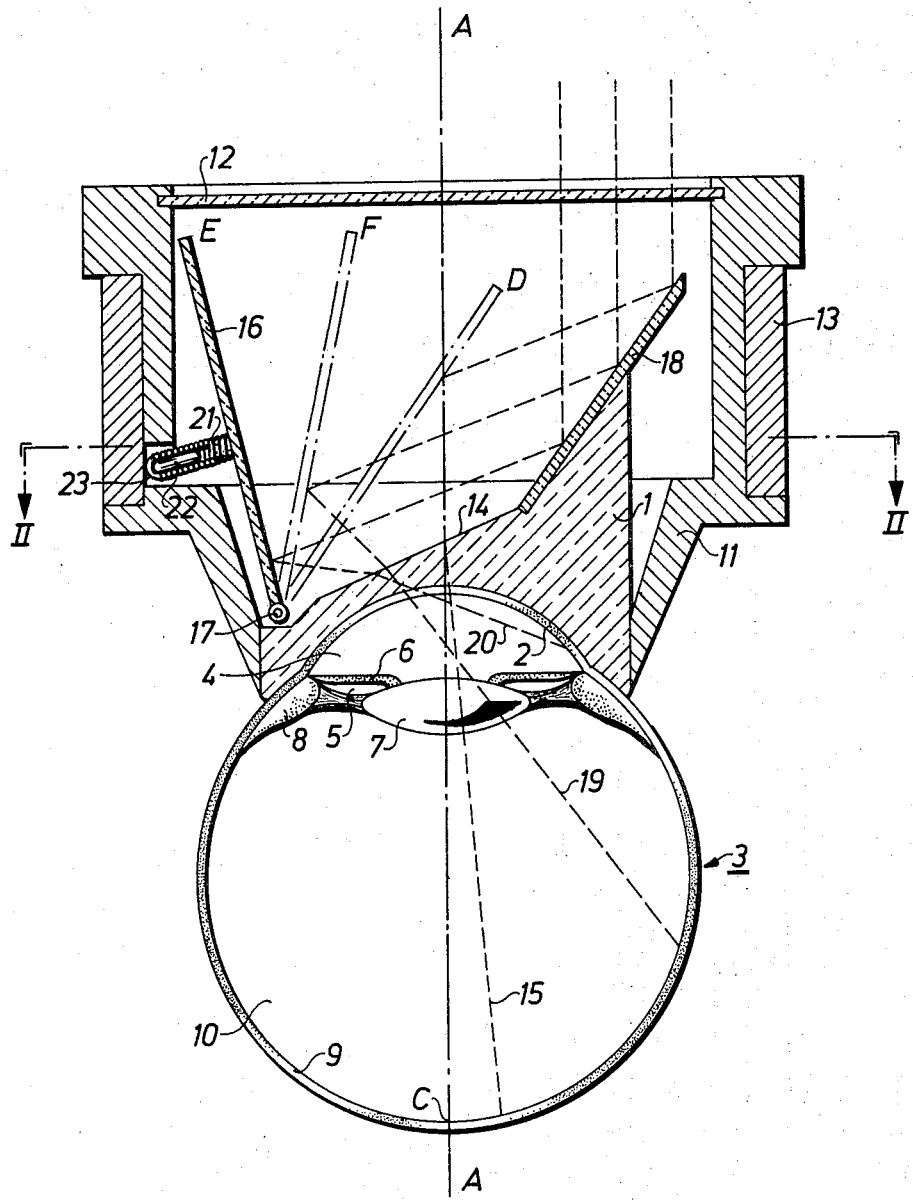
FIG. 1 shows schematically an axial section through a contact glass device according to the invention with one fixed mirror surface and one pivoted mirror surface; the contact glass device being applied on an eye shown only schematically in axial section.

The upper surface 14 of the lens body 1 is planar and inclined relative to the optical axis A—A so that the lens body causes also a prismatic refraction. Due to this the field of view, when the interior of the eye 3 is viewed directly through the lens body 1 in a direction coinciding with the optical axis A—A, will be somewhat laterally displaced relative to the center C of the fundus 9 of the eye, as schematically indicated by the line of view 15. The magnitude of this lateral displacement of the field of view is selected so that the image area on the fundus 9 includes the center C of the fundus. It is appreciated that due to this arrangement it is possible to scan a larger portion of the fundus 9 about its center C simply by rotation of the contact glass device relative to the eye 3 about its optical axis A—A. The surface 14 may conveniently be inclined by an angle of 45° to 65°, preferably about 55°, relative to the optical axis A—A.

In order to make it possible to examine also other portions of the fundus 9 all the way up to the ciliary muscle 8 and also the angle of the anterior chamber 4, the device according to the invention is provided with two mirrors 18 and 16. The mirror 18 is stationarily mounted on the lens body 1, whereas the other mirror 16 is pivoted about an axis 17 in the housing 11. The two mirrors 18 and 16 are located on opposite sides of the optical axis A—A of the lens body 1 with their reflecting surfaces facing each other in such a manner that the perpendiculars of the reflecting surfaces are parallel to a common plane which includes the optical axis A—A. It is appreciated that in this way it will be possible to view the interior of the eye 3 in a non-reversed manner along lines of view which pass through the lens body 1 and are reflected in the mirror 16 as well as in the mirror 18.

When the pivoted mirror 16 is in its inner end position D, indicated by dash-dotted lines in the drawing, in which the mirror 16 is parallel to the mirror 18, one has obviously exactly the same field of view within the interior of the eye 3 as when the interior of the eye is viewed directly through the lens body 1 along a line of view which is not reflected in any one of the two mirrors 16 and 18. By swinging the mirror 16 about its pivot axis 17 from this end position D towards its opposite outer end position E, shown by solid lines in the drawing, the field of view within the eye can be moved continuously away from the center C of the fundus towards the border of the fundus at the ciliary muscle 8. The intermediate position F for the mirror 16, shown by dash-dotted lines in the drawing, gives for instance within the interior of the eye a line of view as indicated by the broken line 19. With the mirror 16 in its outer end position E it is possible to examine the angle of the anterior chamber 4 of the eye, as indicated by the line of view 20.

By rotation of the mirror 16 from its position D towards its position E it is consequently possible to move the area of the fundus 9 being viewed through the contact glass device continuously from the center C of the fundus in radial direction towards the peripheral border of the fundus at the ciliary muscle 8, without any change of the position of the contact glass device relative to the eye 3 being necessary. When such a "radial strip" of the fundus 9 has been scanned from the center C of the fundus towards its peripheral border, the contact glass device can be rotated relative the eye 3 about its optical axis A—A to a different position, whereafter another similar "radial strip" of the fundus can be scanned by rotation of the mirror 16 about its pivot axis 17.

With the mirror 16 in its outer end position E the angle of the interior chamber 4 of the eye can be scanned peripherally by rotation of the contact glass device relative to the eye about its optical axis A—A. It should once more be observed that the viewed image is always non-reversed.

Figure 2:
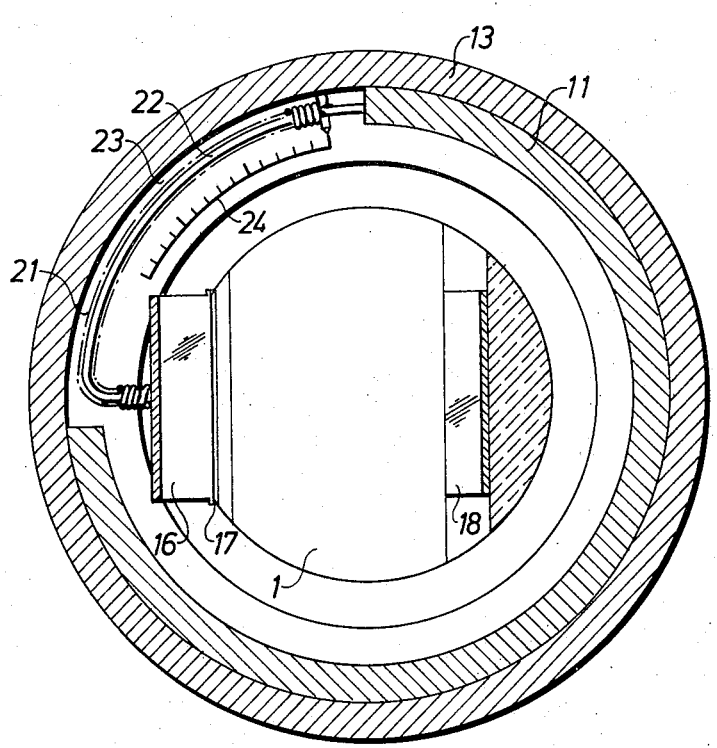
FIG. 2 is a radial section along the line II—II through the contact glass device illustrated in FIG. 1.

The rotatable mirror 16 is operated by means of the ring 13, which is rotatable about the housing 11. For this purpose a flexible, close-lapped coil spring 21 has its one end attached to the back of the mirror 16. This coil spring 21 is slipped over and axially displaceable along a rigid rod or wire 22, which is disposed in an elongate, peripheral opening of slot 23 in the cylindrical wall of the housing 11. This guide rod 22 for the coil spring 21 has its one end attached to the housing 11 at the one end of the peripheral slot 23 so that the guide rod 22 is stationary relative to the housing 11. The opposite end of the coil spring 21 is attached in any suitable manner to the rotatable ring 13, as most readily seen in FIG. 2. By rotation of the ring 13 about the housing 11 it is consequently possible to move the coil spring 21 axially along the guide rod 22 and thus to rotate the mirror 16 about its pivot axis 17. By means of a scale 24 engraved in the housing 11 and visible through the transparent disc 12 it is possible to read off the present angular position of the mirror 16.

As can be seen from FIG. 1, the mirrors 18 and 16 are mounted in such a manner relative to the inclined upper surface 14 of the lens body 1 that the perpendicular of the surface 14 is parallel to the plane containing the optical axis A—A, to which also the perpendiculars of the mirror surfaces 16 and 18 are parallel; the stationary mirror 18 being located at the base of the prism formed by the inclined surface 14, whereas the rotatable mirror 16 is located at the apex of this prism. The inclination of the surface 14 prevents also a total reflection in the surface, when the rotatable mirror 16 is in its outer end position E or close thereto.

It is appreciated that also the mirror 16 may be fixed, if the contact glass device according to the invention is to be used only for the examination of a predetermined portion of the interior of the eye, as for instance the angle of the anterior chamber 4.

Figure 3:
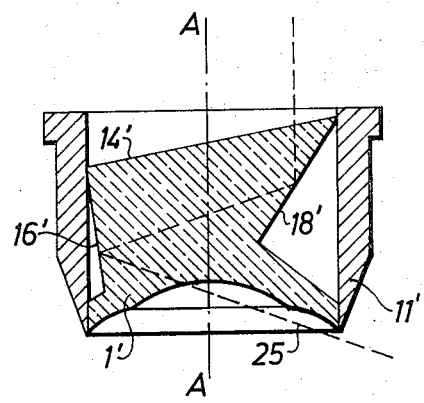
FIG. 3 shows schematically an axial section through another contact glass device according to the invention, which is provided with two fixed mirror surfaces and which can be used for examination of the anterior chamber angle of the eye and also the central portion of the fundus of the eye.

FIG. 3 shows schematically such a contact glass device according to the invention, which is provided with two stationary mirror surfaces and which can be used for examination of the anterior chamber angle in the eye and also the central portion of the fundus of the eye. In this embodiment of the invention the two mirror surfaces 16' and 18' consist of total reflecting surfaces on the lens body 1' itself, which is mounted in a tubular holder or housing 11'. A dotted line 25 indicates the line of view through the lens body 1' reflected in the two mirror surfaces 16' and 18' for an examination of the anterior chamber angle in the eye. However, this contact glass device can also be used for examination of the central portion of the fundus of the eye directly through the lens body 1' along a line of view which is not reflected in any of the mirror surfaces 16' and 18'. The planar upper surface 14' of the lens body 1' is therefore preferably inclined relative to the optical axis so that the lens body 1' causes a prismatic refraction in the manner explained in the foregoing.

It is appreciated that also other embodiments of the invention are possible in addition to those described in the foregoing. Thus, for instance, the mechanical devices for operating the pivoted mirror may be designed in various different manners. Further, a contact glass device according to the invention may also be provided with means for impressing the eye ball, as previously known in the art, for facilitating the examination of the fundus of the eye close to its outer border adjacent the ciliary muscle.

I claim:

1. A contact glass device for biomicroscopic examinations of an eye, comprising a lens body of a transparent material provided with a concave surface adapted for application upon the cornea of the eye to be examined with the axis of symmetry of the concave surface coinciding with the optical axis of the eye and having such a focal length that the interior of the eye can be viewed through the lens body by means of a microscope, a first and a second light reflecting surface located at the side of the lens body opposite to said concave surface and on opposite sides of said axis of symmetry so as to face each other with their perpendiculars parallel to a common plane containing said axis of symmetry and inclined relative said axis of symmetry in such a manner that the interior of the eye can be viewed non-reversed along a line of view which is reflected in both said reflecting surfaces and passes through the lens body.

2. A contact glass device as claimed in claim 1, wherein said first light reflecting surface is stationary relative to the lens body and said second light reflecting surface is pivoted relative to the lens body about a pivot axis which is perpendicular to said plane and located at the edge of said second reflecting surface closest to the lens body, whereby the field of view within the interior of the eye obtained along a line of view reflected in both said reflecting surfaces and passing through the lens body can be moved in substantially radial direction relative to the center of the fundus of the eye by rotation of said second reflecting surface about said pivot axis.

3. A contact glass device as claimed in claim 2, wherein said second light reflecting surface is parallel to said first light reflecting surface in the one end position of its pivot angle, whereby a line of view reflected in said two reflecting surfaces provides substantially the same field of view within the interior of the eye as a line of view passing directly through the lens body without any reflection in the reflecting surfaces, whereas in its opposite end position of its pivot angle said second reflecting surface is inclined relative to said first reflecting surface by such an angle that a line of view reflected in both said mirror surfaces makes it possible to examine the anterior chamber angle in the eye.

4. A contact glass device as claimed in claim 2, comprising a substantially tubular housing having the lens body mounted in its one end and surrounding the two light reflecting surfaces and an annular member mounted for rotation about said housing, said annular member being coupled to one end of an elongate, flexible member guided for axial displacement and said elongate member having its opposite end coupled to said second pivoted light reflecting surface so that said second reflecting surface can be pivoted about its pivot axis by rotation of said annular member about said housing.

5. A contact glass device as claimed in claim 4, wherein said elongate flexible member consists of a close-lapped coil spring, which is slipped over and axially displaceable along a rigid rod, which is stationary relative to the housing and located in an elongate peripherally extending opening in the cylindrical wall of the housing, one end of said coil spring being attached to the rear side of said rotatable second light reflecting surface and its opposite end being attached to said rotatable annular member, which covers said elongate opening in the wall of the housing.

6. A contact glass device as claimed in claim 4, wherein the opposite end of said tubular housing is closed by a transparent disc.

7. A contact glass device as claimed in claim 1, wherein said first and second light reflecting surfaces are stationary and so inclined relative each other and said axis of symmetry that the anterior chamber angle in the eye can be viewed along a line of view reflected in both said reflecting surfaces and passing through the lens body.

8. A contact glass device as claimed in claim 7, wherein said two reflecting surfaces consist of substantially totally reflecting surfaces on the lens body.

9. A contact glass device as claimed in claim 1, wherein the surface of the lens body opposite to said concave surface is planar and inclined relative to said axis of symmetry so as to have its perpendicular parallel to said common plane, which contains said axis of symmetry and is parallel to the perpendiculars of said first and second light reflecting surfaces, whereby the lens body causes also a prismatic refraction, the base of the prism being located adjacent said first light reflecting surface.

10. A contact glass device as claimed in claim 1, wherein said first and second light reflecting surfaces are disposed so as to permit observation of the interior of the eye along a line of view passing directly through the lens body without reflection in any of the reflecting surfaces.

* * * * *